(12) United States Patent
Hughes

(10) Patent No.: US 9,862,061 B2
(45) Date of Patent: Jan. 9, 2018

(54) WELDING TORCH ELECTRODE

(71) Applicant: Camarc LLC, Westland, MI (US)

(72) Inventor: Russell Vernon Hughes, Plymouth, MI (US)

(73) Assignee: Camarc LLC, Westland, MI (US)

( * ) Notice: Subject to any disclaimer, the term of this patent is extended or adjusted under 35 U.S.C. 154(b) by 0 days.

(21) Appl. No.: 15/093,820

(22) Filed: Apr. 8, 2016

(65) Prior Publication Data

US 2016/0221126 A1   Aug. 4, 2016

Related U.S. Application Data

(62) Division of application No. 14/153,190, filed on Jan. 13, 2014.

(51) Int. Cl.
*B23K 35/02* (2006.01)
*B23K 9/28* (2006.01)

(52) U.S. Cl.
CPC ............... *B23K 35/02* (2013.01); *B23K 9/28* (2013.01); *B23K 35/0205* (2013.01); *B23K 35/0255* (2013.01)

(58) Field of Classification Search
CPC . B23K 9/24; B23K 9/28; B23K 35/00; B23K 35/02; B23K 35/0205; B23K 35/0255
USPC .................................................. 219/145.21
See application file for complete search history.

(56) References Cited

U.S. PATENT DOCUMENTS

| 4,645,901 | A | 2/1987 | Scholz et al. |
| 4,929,811 | A | 5/1990 | Blankenship |
| 5,258,599 | A | 11/1993 | Moerke |
| 6,215,089 | B1 * | 4/2001 | Schwankhart ........... H05H 1/34 219/121.45 |
| 6,232,574 | B1 | 5/2001 | Oakley |
| 6,433,300 | B1 | 8/2002 | McBennett |
| 6,528,753 | B2 | 3/2003 | McBennett |
| 6,818,861 | B2 | 11/2004 | Maeda |
| 2005/0211684 | A1 | 9/2005 | Jaeger et al. |
| 2008/0190899 | A1 | 8/2008 | Sugahara et al. |

(Continued)

FOREIGN PATENT DOCUMENTS

| CA | 2273612 | 12/1999 |
| DE | 3400282 | 7/1985 |

(Continued)

OTHER PUBLICATIONS

Database WPI, Week 198001, Thomson Scientific, London, GB, AN 1980-01201C; XP002734208.

(Continued)

*Primary Examiner* — Brian Jennison
(74) *Attorney, Agent, or Firm* — Carlson, Gaskey & Olds, P.C.

(57) ABSTRACT

An electrode includes an elongated body defining a longitudinal axis. A seating end portion includes a first truncated cone. The first truncated cone has a first truncated end and an opposing conical end. A working end portion includes a second truncated cone having a second truncated end. A constant length is defined between the opposing conical end and the second truncated end. The constant length is about 0.875 inch +/−0.001 inch. The elongated body is located between the seating end portion and the working end portion.

22 Claims, 21 Drawing Sheets

(56) References Cited

U.S. PATENT DOCUMENTS

| | | | |
|---|---|---|---|
| 2009/0045174 A1 | 2/2009 | Haberler et al. | |
| 2009/0145889 A1 | 6/2009 | Hutchison | |
| 2011/0272383 A1* | 11/2011 | Jarvis | B23K 9/296 219/75 |
| 2014/0034618 A1 | 2/2014 | Twarog | |

FOREIGN PATENT DOCUMENTS

| | | |
|---|---|---|
| EP | 0056421 | 7/1982 |
| EP | 2894005 A1 | 7/2015 |
| FR | 2682626 A1 | 4/1993 |
| FR | 2987967 A1 | 9/2013 |
| SU | 656781 | 4/1979 |
| WO | 2010/045676 | 4/2010 |

OTHER PUBLICATIONS

European Search Report for EP Application No. 15150541.9 dated May 28, 2015.
International Search Report and Written Opinion for PCT Application No. PCT/US2014/063783 dated Jan. 21, 2015.
International Preliminary Report on Patentability for International Application No. PCT/US2014/063783 dated Jul. 28, 2016.
Seamlessly joined? Comparing cast and soldered electrodes for spot welding., Aug. 27, 2013, pp. 1-2, https://www.plansee.com/en/news-archive/News/detail/seamlessly-joined-comparing-cast-and-soldered-electrodes-for-spot-welding.html.
International Search Report and Written Opinion for International Application No. PCT/US2016/068243 dated Apr. 21, 2017.
International Search Report and Written Opinion for International Application No. PCT/US2016/068251 dated Feb. 24, 2017.

* cited by examiner

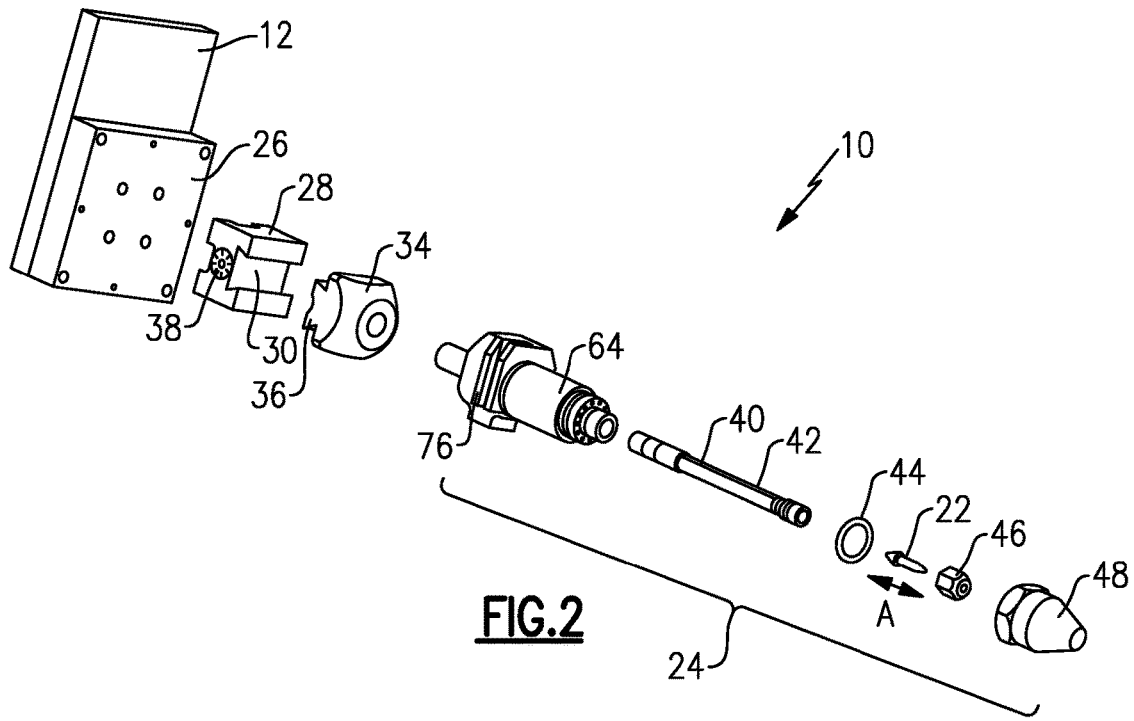
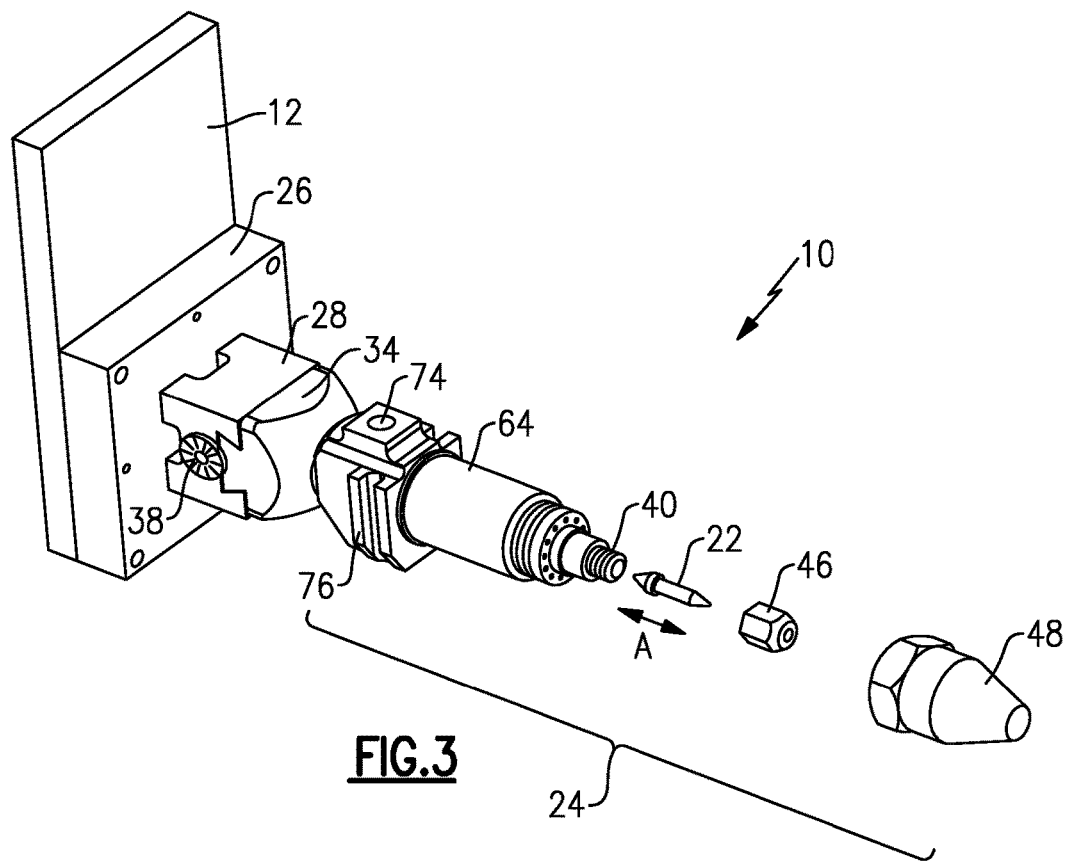

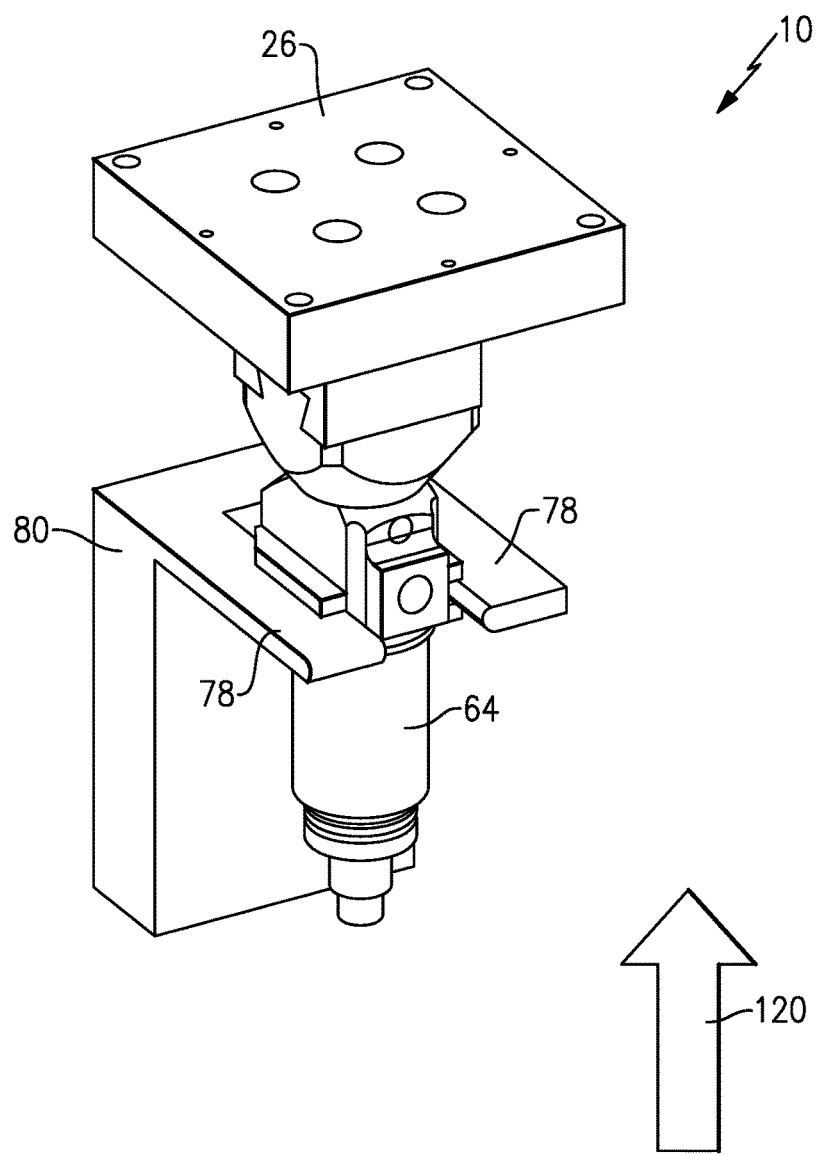
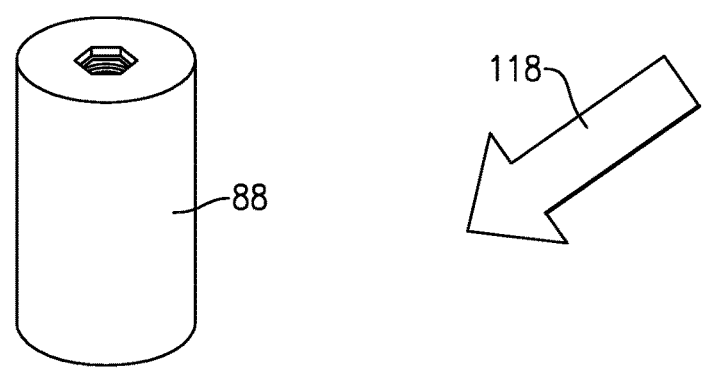
FIG.20

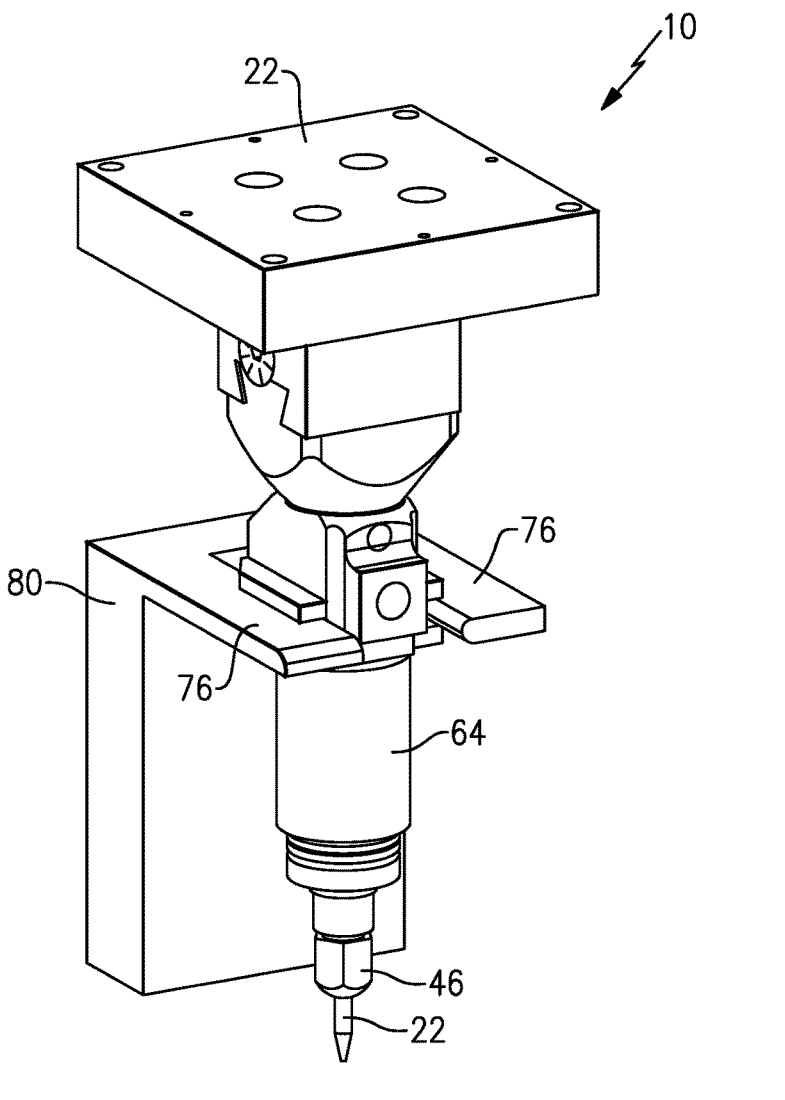
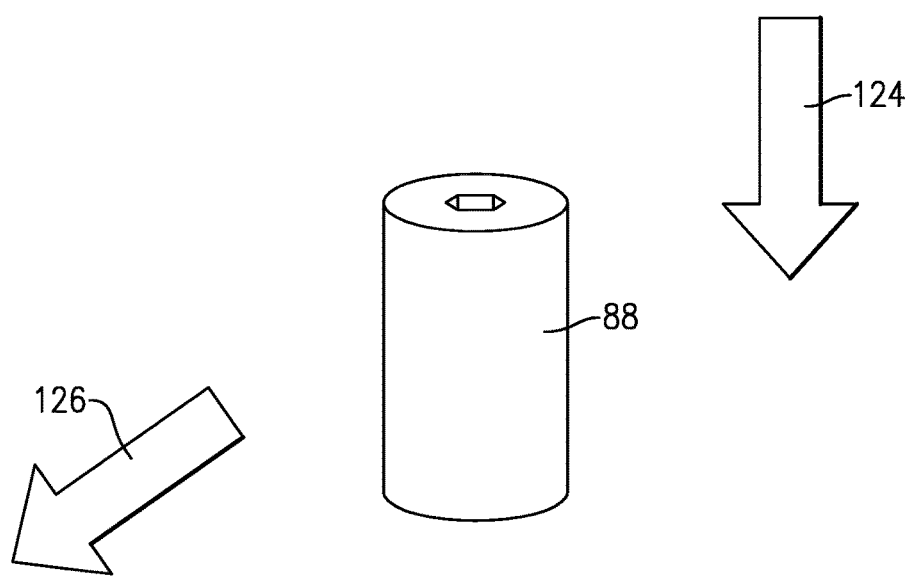
FIG.22

WELDING TORCH ELECTRODE

BACKGROUD OF THE INVENTION

This application is a divisional of U.S. application Ser. No. 14/153,190 filed Jan 13, 2014.

BACKGROUND OF THE INVENTION

A TIG (Tungsten Inert Gas) welding torch is mounted in a seam tracker and manipulated by a robot arm to melt filler wire, fusing separate workpieces or panels of an automotive body together at a weld seam. The welding torch includes a tungsten electrode that should be easily aligned in a direction transverse to the weld seam with the filler wire. When the electrode is removed from the welding torch, it is important that the positioning of the new electrode is repeatable to eliminate time consuming recalibration of the welding torch.

In prior welding torches, a long electrode is employed having a length of about 4.25 inch. When the electrode needs to be replaced, the electrode is removed from the welding torch and ground to remove the used portion of the electrode. Each time the electrode is ground, about $5\%_{1,000}$ inch of material is removed from the electrode. The electrode is then manually repositioned in the welding torch. When the electrode is reinstalled, a distance between a tip of the electrode and the workpiece needs to be maintained constant to provide consistent results. The time needed to properly manually reinstall the electrode can shut down an assembly line, losing both time and money. Additionally, after approximately 8 to 10 regrinds, the electrode has a length of about 3.75 inch and must be replaced. This wastes a large amount of material.

A welding torch can be used to weld sheet metal workpieces together at a weld seam. In one example, the sheet metal workpieces are a roof and a body of a vehicle. Styles of vehicles are limited by the fact that there are constraints on how much metal can be stretched. A new vehicle style can be created by using several pieces of metal.

SUMMARY OF THE INVENTION

In a featured embodiment, an electrode includes an elongated body defining a longitudinal axis. A seating end portion includes a first truncated cone. The first truncated cone has a first truncated end and an opposing conical end. A working end portion includes a second truncated cone having a second truncated end. A constant length is defined between the opposing conical end and the second truncated end. The constant length is about 0.875 inch +/−0.001 inch. The elongated body is located between the seating end portion and the working end portion.

In another embodiment according to the previous embodiment, the first truncated cone defines an included angle of about 45°.

In another embodiment according to any of the previous embodiments, the second truncated cone is defined an included angle of about 30°.

In another embodiment according to any of the previous embodiments, the seating end surface is substantially planar and substantially perpendicular to the longitudinal axis.

In another embodiment according to any of the previous embodiments, the working end surface is substantially planar and substantially perpendicular to the longitudinal axis.

In another embodiment according to any of the previous embodiments, the seating end portion includes a circumferential surface and an angled surface located between the circumferential surface and the elongated body. The circumferential surface is located between the first truncated cone and the angled surface, and the angled surface defines an included angle of about 90°.

In another featured embodiment, an electrode includes an elongated body defining a longitudinal axis, a seating end portion including a first truncated cone, and a working end portion including a second truncated cone. The elongated body is located between the seating end portion and the working end portion.

In another embodiment according to the previous embodiment, the first truncated cone has an included angle of about 45°.

In another embodiment according to any of the previous embodiments, the second truncated cone has an included angle of about 30°.

In another embodiment according to any of the previous embodiments, the first truncated cone has a first truncated end and an opposing conical end. The second truncated cone has a second truncated end. A constant length is defined between the opposing conical end, and the second truncated end and the constant length is about 0.875 inch +/−0.001 inch.

These and other features of the present invention can be best understood from the following specification and drawings, the following of which is a brief description.

BRIEF DESCRIPTION OF THE DRAWINGS

FIG. 2 illustrates an exploded view of the welding torch;

FIG. 3 illustrates an assembled view of the welding torch, with an electrode, an electrode retaining nut and a gas shield cup removed;

FIGS. 12 to 26 illustrate a method of changing an electrode of the welding torch.

DETAILED DESCRIPTION OF THE PREFERRED EMBODIMENT

Figure 1:
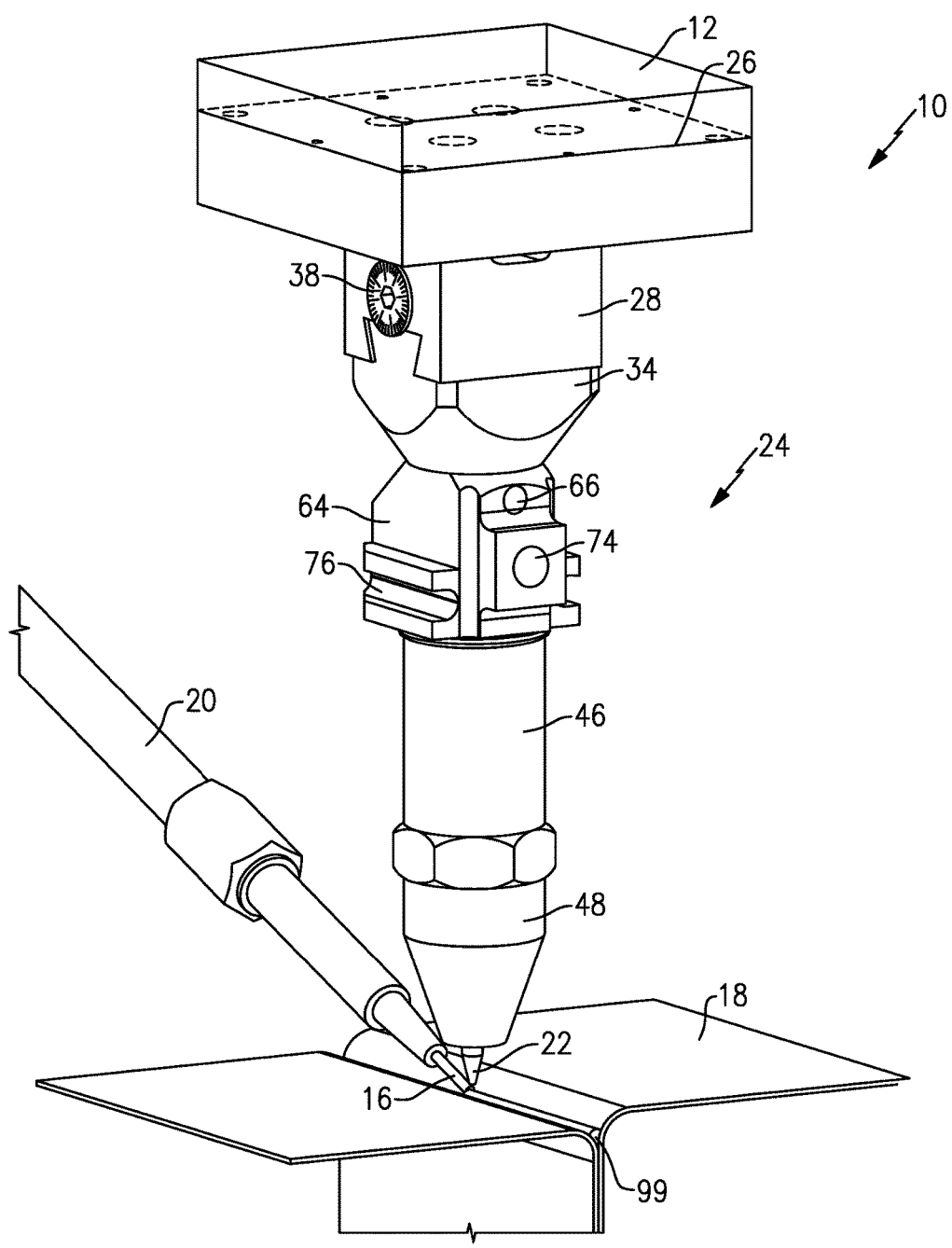
FIG. 1 illustrates a welding torch assembly that welds together workpieces.

As shown in FIG. 1, a TIG (tungsten insert gas) welding torch assembly 10 is mounted on a seam tracker 12 (shown schematically in FIG. 2) and is manipulated by a robot arm (not shown) to melt a feed of filler wire 16 into a welding bead to form a weld seam 99 to weld together two sheet metal workpieces 18. In one example, the filler wire 16 is bronze or aluminum alloy, and the workpieces 18 are a zinc coated steel or an aluminum alloy, respectively.

A guide arm 20 introduces the filler wire 16 under a tungsten electrode 22 (shown in FIGS. 2 and 3) installed in a welding torch 24 of the welding torch assembly 10. As explained below, the welding torch 24 can be slid to align the electrode 22 with the filler wire 16. The electrode 22 and the filler wire 16 must be precisely aligned to a preset value.

The electrode 22 is precisely machined to provide repeatable results. A vertical gap, or arc length B, is defined between a point of the electrode 22 and a lower surface 25 of the filler wire 16, and the arc length B must be maintained for repeatable welding results. In one example, the arc length B is approximately 1.0 mm. Additionally, the method of removing and replacing the electrode 22 is repeatable such that no additional alignment steps are required before the welding process can be restarted.

FIGS. 2 and 3 illustrate the welding torch 24. The welding torch 24 is mounted to an electrically insulating mounting plate 26 that secures the welding torch 24 to the seam tracker 12. An adjustment track 28 including a dovetailed shape groove 30 is mounted to the mounting plate 26 by a fastener (not shown). In one example, the fastener is a bolt.

An adjustment body 34 is attached to the adjustment track 28 and slidable relative to the adjustment track 28. The adjustment body 34 includes a protrusion 36 that is received in the groove 30 of the adjustment track 28. In another example, the adjustment track 28 includes the protrusion 36, and the adjustment body 34 includes the groove 30. When the protrusion 36 is received in the groove 30, the adjustment body 34 is slidable along the adjustment track 28 to align the welding torch 24 with the filler wire 16.

An adjustable fastener 38 provides fine adjustment and alignment between the mounting plate 26 and the adjustment track 28. In one example, the adjustable fastener 38 is a graduated micrometric adjustment screw.

The welding torch 24 includes an electrode 22 and an electrode holder 40. In one example, the electrode 22 is made of tungsten. However, the electrode 22 could be many of any tungsten alloy or can be "doped" with other elements (for example, thorium, cerium, yttrium, lanthanum). In one example, the electrode holder 40 is a water cooled copper electrode holder 40 as copper is highly conductive. The electrode holder 40 includes a flattened portion 42 that allows the water to flow through the electrode holder 40. In one example, the coolant is deionized water and anti-freeze. A plurality of seals are located around the electrode holder 40. In one example, the seals are o-rings. An electrode retaining nut 46 secures the electrode 22 relative to the electrode holder 40. An electrically insulative shield gas cup 48 is secured to the welding torch 24. In one example, the shield gas cup 48 is made of aluminum. A seal 44 is located inside the shield gas cup 48. In one example, the seal 44 is a o-ring. To replace the electrode 22, the retaining nut 46 and the gas shield cup 48 are removed.

During use, shield gas flows through a hole in the shield gas cup 48. In one example, the shield gas is argon. A welding arc is struck, and the filler wire 16 is melted to form a weld bead. The welding torch 24 is then moved during welding to create a weld seam between the workpieces 18.

Figure 4:
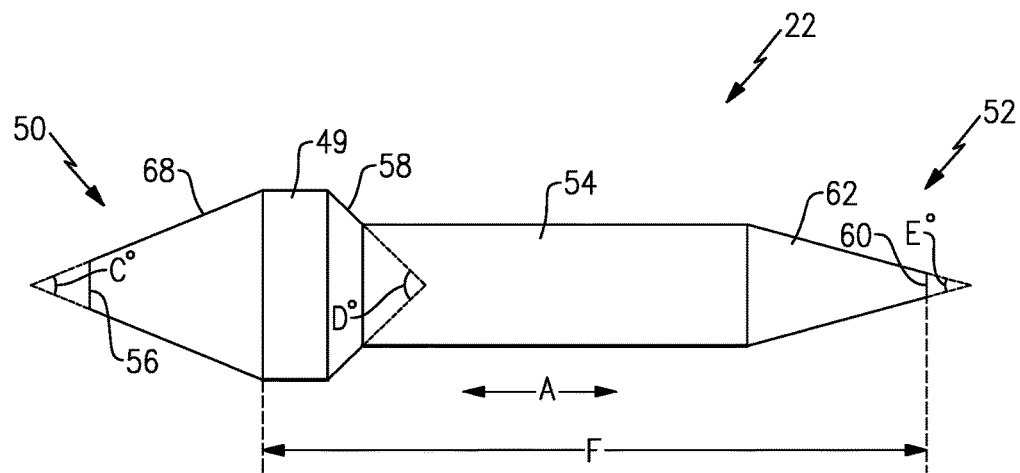
FIG. 4 illustrates the electrode.

FIG. 4 illustrates the electrode 22. The electrode 22 includes a seating end portion 50, a working end portion 52, an elongated body 54 located between the seating end portion 50 and the working end portion 52, and a longitudinal axis A. The seating end portion 50 defines a first truncated cone, and the working end portion defines a second truncated cone.

The seating end portion 50 has a seating end flat end surface 56 that defines a plane substantially perpendicular to the longitudinal axis A, a circumferential surface 49 that extends around the longitudinal axis A, a first seating end angled surface 68 that extends between the seating end flat end surface 56 and the circumferential surface 49, and second seating end angled surface 58 that extends between the circumferential surface 49 and the elongated body 54. The seating end flat end surface 56 prevents the electrode 22 from bottoming out when installed in the welding torch 24.

The working end portion 52 is the working end from which the TIG welding arc is struck. The working end portion 52 includes a working end flat end surface 60 that defines a plane substantially perpendicular to the longitudinal axis A and a working end angled surface 62 that extends between the working end flat end surface 60 and the elongated body 54.

The seating end flat end surface 56 has a diameter of about 0.060 inch. The seating end flat end surface 56 and the first seating end angled surface 68 define an included angle C of about 45°. The circumferential surface 49 has a diameter of about 0.25 inch. The second seating end angled surface 58 and the circumferential surface 49 define an included angle D of about 90°.

The working end flat end surface 60 has a diameter of about 0.030 inch. The working end flat end surface 60 and the working end angled surface 62 define an inclined angle E of 30°.

The elongated body 54 has a diameter of about 0.18 inch. A length F from the working end flat end surface 60 to the intersection of the first seating end angled surface 68 and the circumferential surface 49 is about 0.875 inch +/−0.001 inch. The length F has a constant length that is critically controlled throughout the use and the lifetime of the electrode 22. The length F allows the electrode 22 to protrude sufficiently from the shield gas cup 48 to allow unobstructed access to the weld area with the required length of the welding arc, while minimizing a distance between the hot working end of the electrode 22 and the liquid cooled electrode holder 40 to facilitate heat transfer. Other lengths are possible, but the lengths need to be consistent to provide accuracy of the arc length B, which is controlled within about 0.001 inch, eliminating the need for further adjustments after the electrode 22 is changed. As the electrode 22 is shorter than prior electrodes 22, there is more control during the welding process.

The retaining nut 46 contacts the first seating end angled surface 68 of the electrode 22 when the electrode 22 is secured in the torch body 64. The seating end portion 50 mates precisely, concentrically and axially in a matching conical recess (truncated to about 0.030 inch diameter flat) in the electrode holder 40. In one example, the recess has an angle of about 45°, which matches the included angle C of the electrode 22. Although the angle of 45° has been described, it is to be understood that other angles can employed. The angle of the recess and the included angle C of the electrode 22 must match to ensure accurate mating. If the angle is too large, the area of engagement is reduced, reducing the area of heat transfer. If the angle is too small, the contact area between the electrode 22 and the electrode holder 40 increases, increasing the possibility that the electrode 22 will stick in the electrode holder 40 when the retaining nut 46 is removed.

The second seating end angled surface 58 including the 90° included angle D mates with a matching seating on the retaining nut 46. The included angle D reduces the risk of fracturing the electrode 22 due to stress during the machining process, handling or during welding. However, it is to be understood that other angles could be used.

If it is difficult or expensive to precisely control a length of the electrode 22, a servo actuator used within the seam tracker 12 can carefully advance the welding torch 24 until the point of the electrode 22 touches the filler wire 16. A simple electrical circuit of low voltage and current connected between the electrode 22 and the filler wire 16 would become "closed" when the electrode 22 and filler wire 16 contact. When the closure is sensed, the servo actuator is commanded to retract the welding torch 46 a pre-determined distance to define the arc length B, thereby resulting in a controlled arc length B being set.

Figure 5:
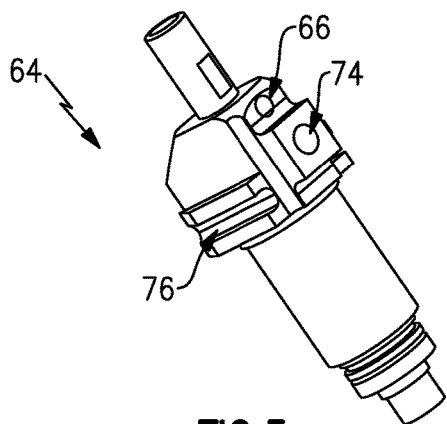
FIG. 5 illustrates a perspective view of a torch body.
Figure 6:
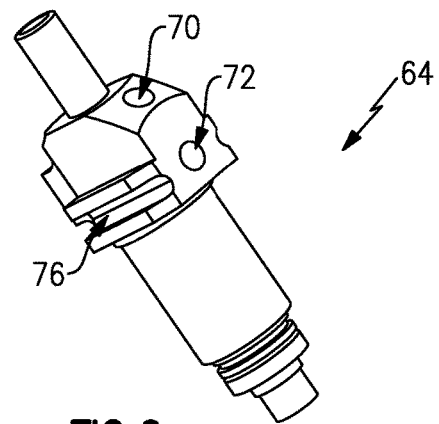
FIG. 6 illustrates an opposing perspective view of the torch body.

FIGS. 5 and 6 illustrate the torch body 64. The torch body 64 includes a through drilled tapped hole 66 for fitment of a fastener (not shown) that secures the electrode holder 40 relative to the torch body 64. In one example, the fastener is a screw. In one example, the tapped hole 66 is a through drilled M6 tapped hole for fitment of a fastener (now shown) that secures the electrode holder 40 in place. The tapped hole 66 intersects a bore of the electrode holder 40. When the fastener is inserted into the tapped hole, the fastener engages the flattened portion 42 of the electrode holder 40 when tightened, securing the electrode holder 40 both longitudinally and rotationally in the torch body 64 during when the retaining nut 46 is installed and removed.

The torch body 64 also includes an inlet port 70 for liquid coolant, an inlet port 72 for the shield gas, and an outlet port 74 for the liquid coolant. The torch body 64 also includes a slot 76 on opposing sides of the torch body 64 that can be engaged by arms 78 in a fixed docking station 80 to protect the seamtracker 12 from torques during the removal and installation of the shield gas cup 48, the electrode 22 and the retaining nut 46, as discussed below.

Figure 7:
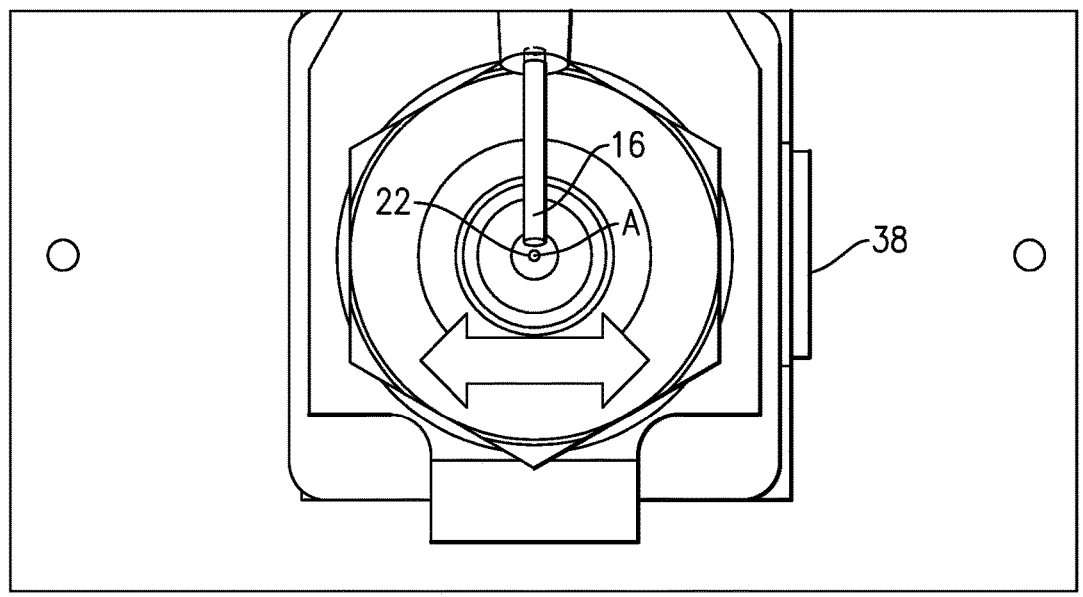
FIG. 7 illustrates a close up view of FIG. 7 illustrating fine movement of the electrode relative to the filer wire.

FIG. 1 illustrates the welding torch 24 during use, and FIG. 7 illustrates graduated fine movement of the welding torch 24 along the longitudinal axis A of the electrode 22 relative to the axis of the filler wire 16 by micro-metric adjustment of the adjustable fastener 38. The alignment relationship between the electrode 22 and the filler wire 16 can be adjusted by moving the welding torch 24 or the guide arm 20.

Figure 8:
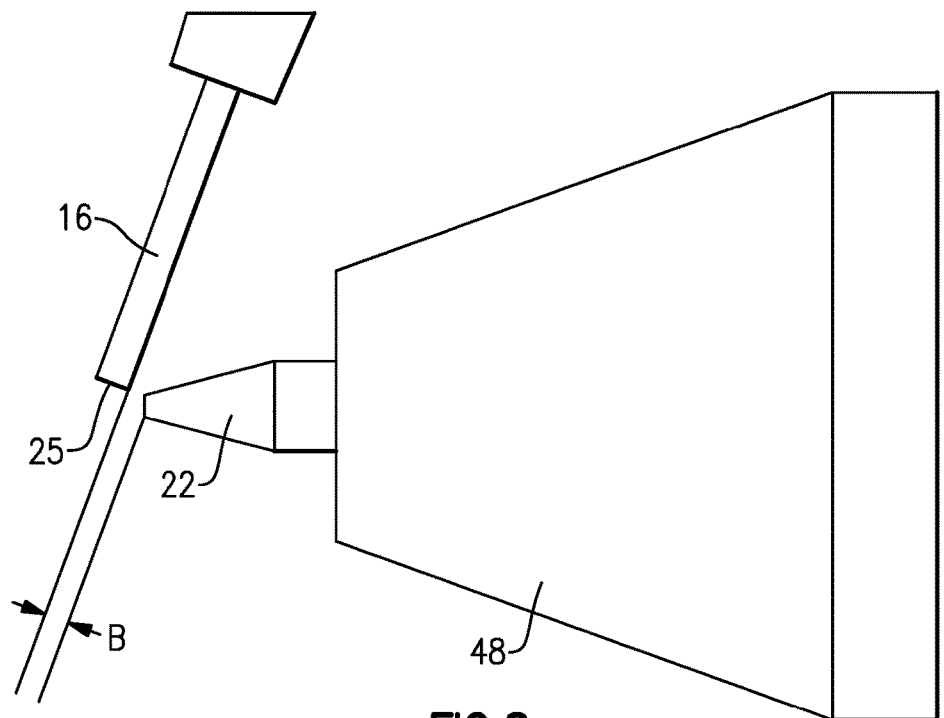
FIG. 8 illustrates an arrangement of the electrode and the filler wire.

As shown in FIG. 8, the arc length B is consistently maintained after installation of the electrode 22 by precisely machining the electrode 22 (about +/−0.001 inch). With an arc length B of typically around about 1.0 mm (0.040 inch), a 2.5% variance is accurate enough for repeatable operation of the welding process under fully automated conditions.

Figure 9:
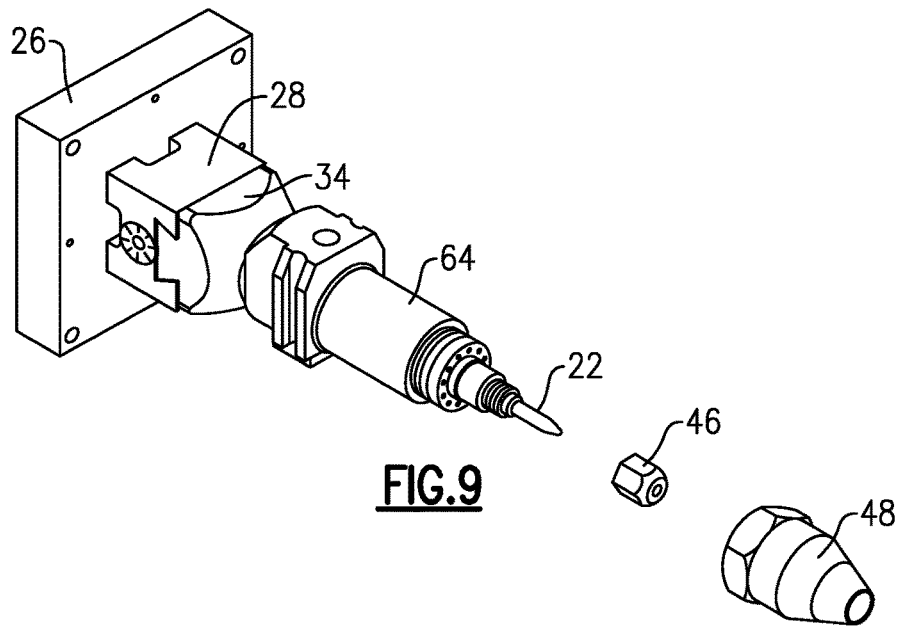
FIG. 9 illustrates the electrode seated in an electrode holder.
Figure 10:
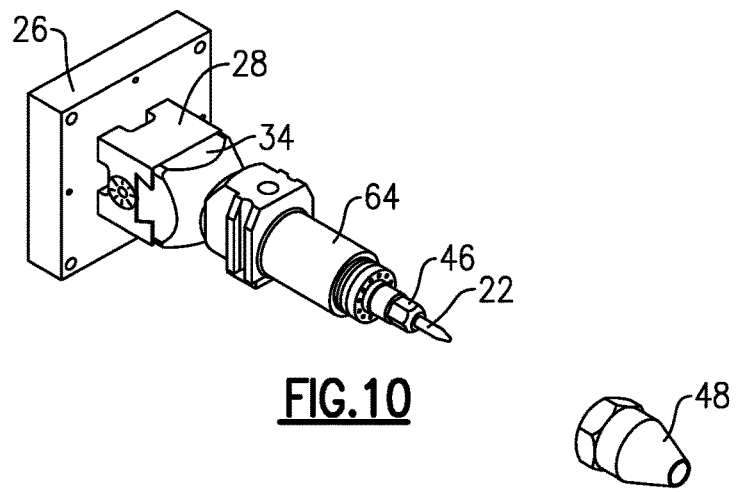
FIG. 10 illustrates an electrode retaining nut fitted over the electrode.
Figure 11:
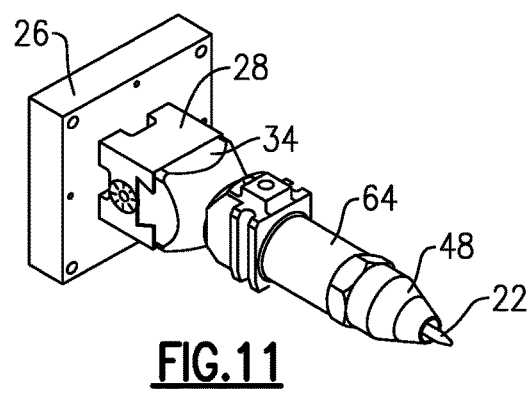
FIG. 11 illustrates a gas shield cup secured to the torch body.

FIGS. 9, 10 and 11 illustrate the assembly process for installing the electrode 22 and the shield gas cup 48. Although the welding torch 24 described is generally used with a robot arm 14 or other mechanized device as described below, the electrode 22, the retaining nut 46, and the shield gas cup 48 can be installed and removed by a manual operator if production volumes are low and maintenance of the welding torch 24 is not severely time constrained.

During use of the welding torch 24, the electrode 22 will wear and deteriorate over time. The wear can be determined by the appearance of the welding arc, a detected voltage, an algorithm or an image obtained by a camera.

Figure 12:
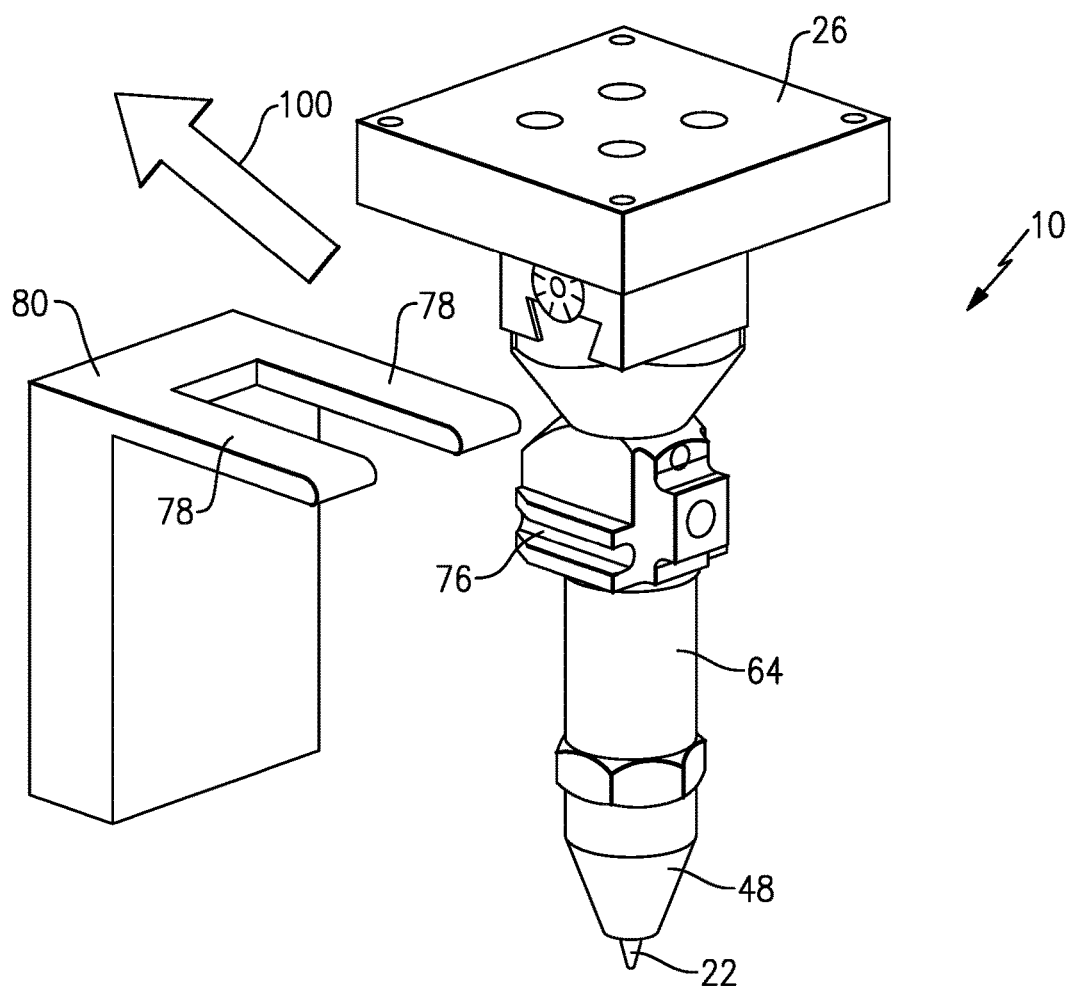
Figure 13:
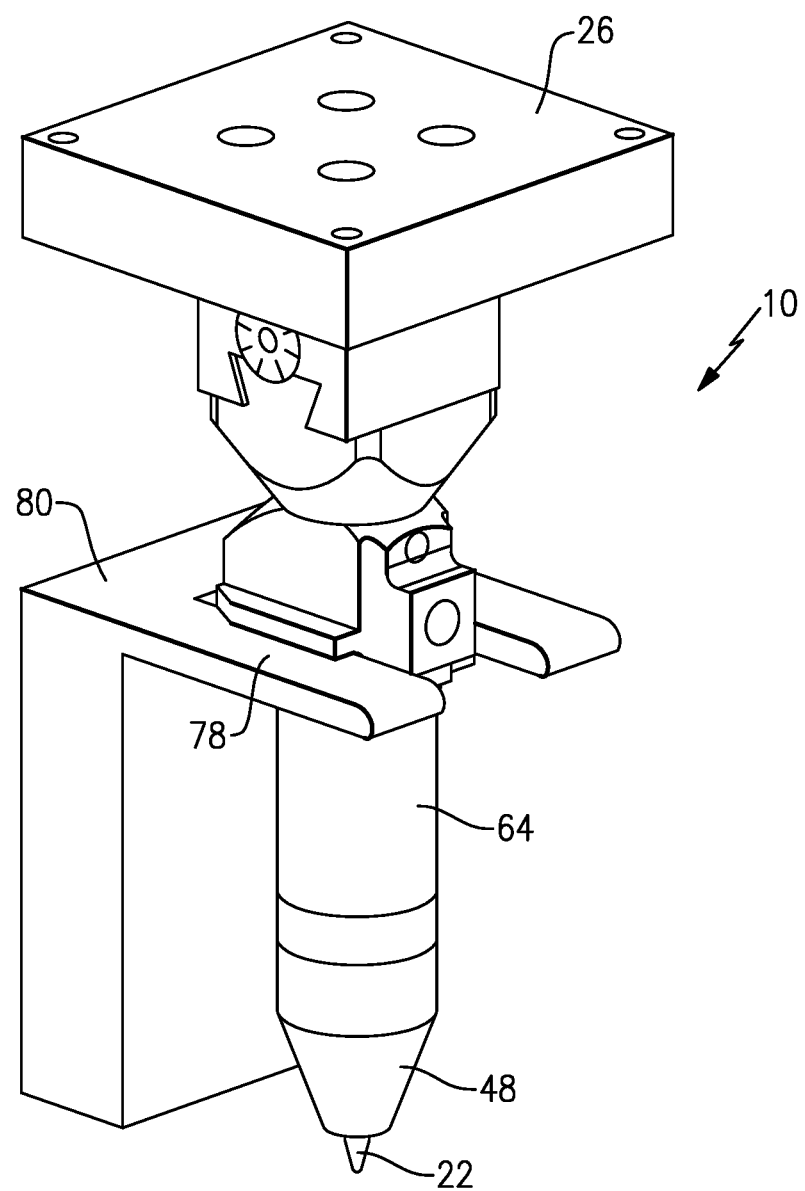

FIGS. 12 to 26 illustrate an automatic consumable changing process for changing the electrode 22 in the welding torch 24. As shown in FIG. 12, the welding torch 24 is removed from the seam tracker 12 and moved along arrow 100 by the robot arm 14 to be brought into alignment with the fixed docking station 80. In FIG. 13, the welding torch 24 is positioned in the fixed docking station 80 such that one of the opposing arms 78 of the fixed docking station 80 is received in one of the slots 76 of the welding torch 24.

Figure 14:
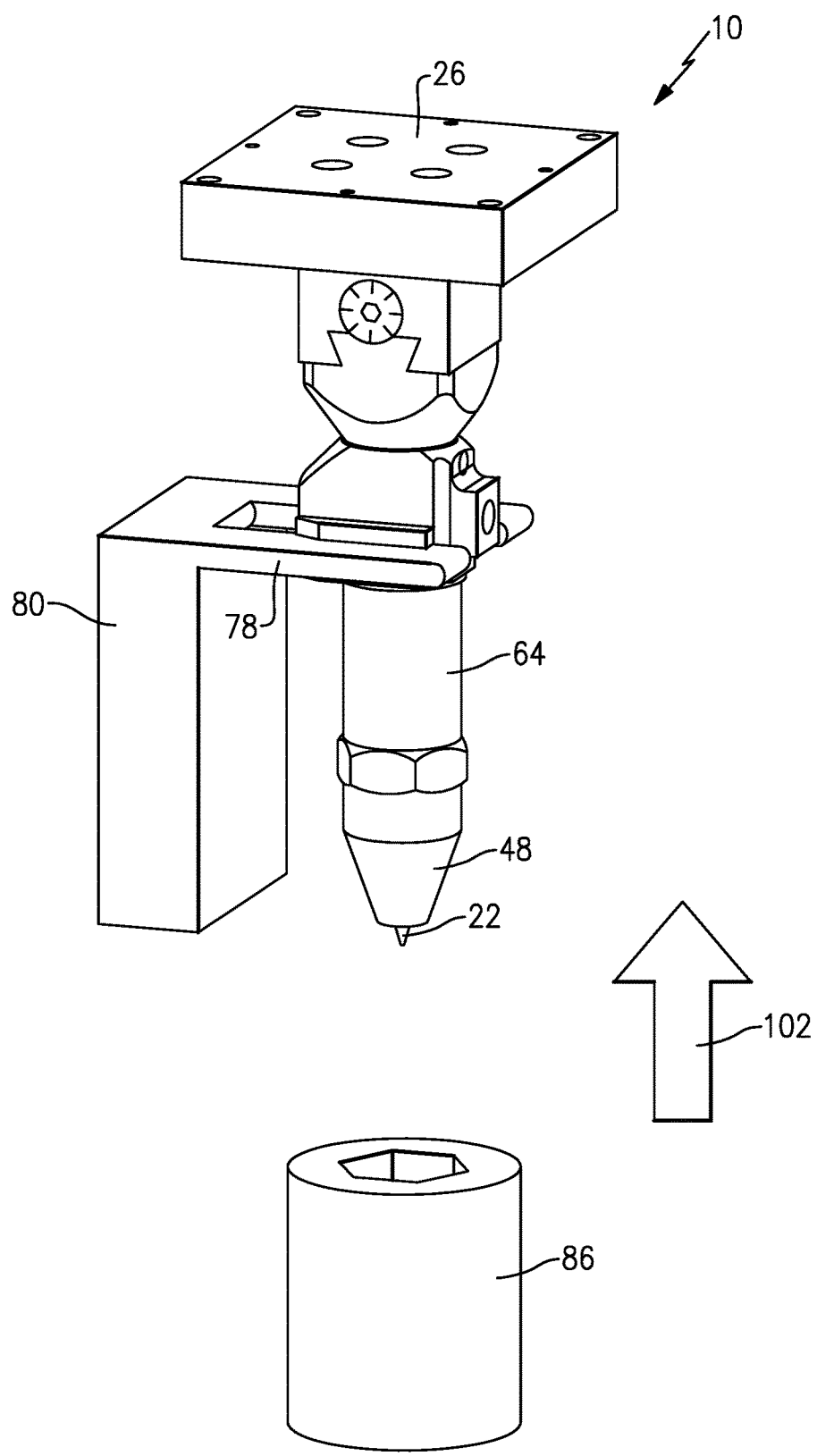
Figure 15:
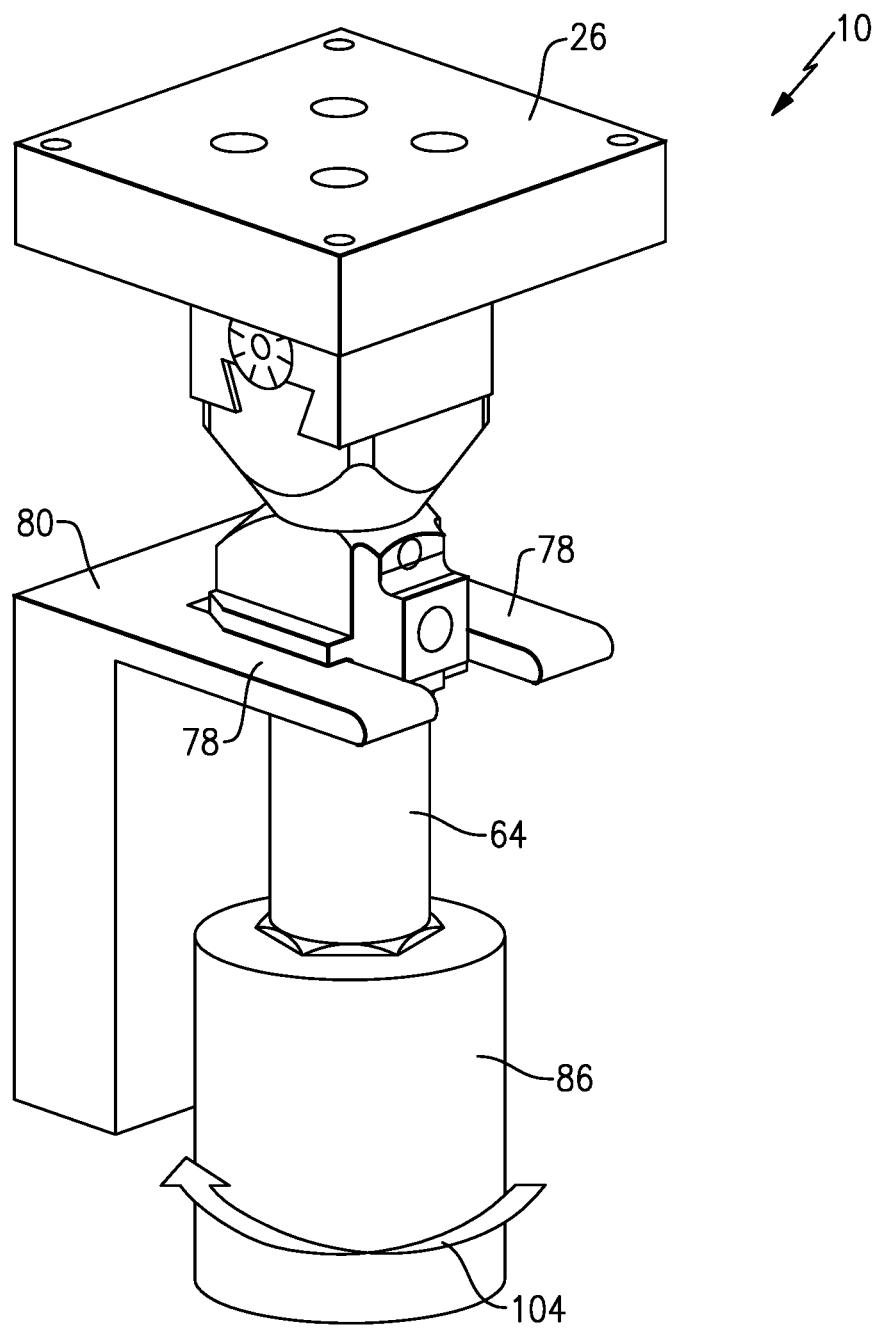
Figure 16:
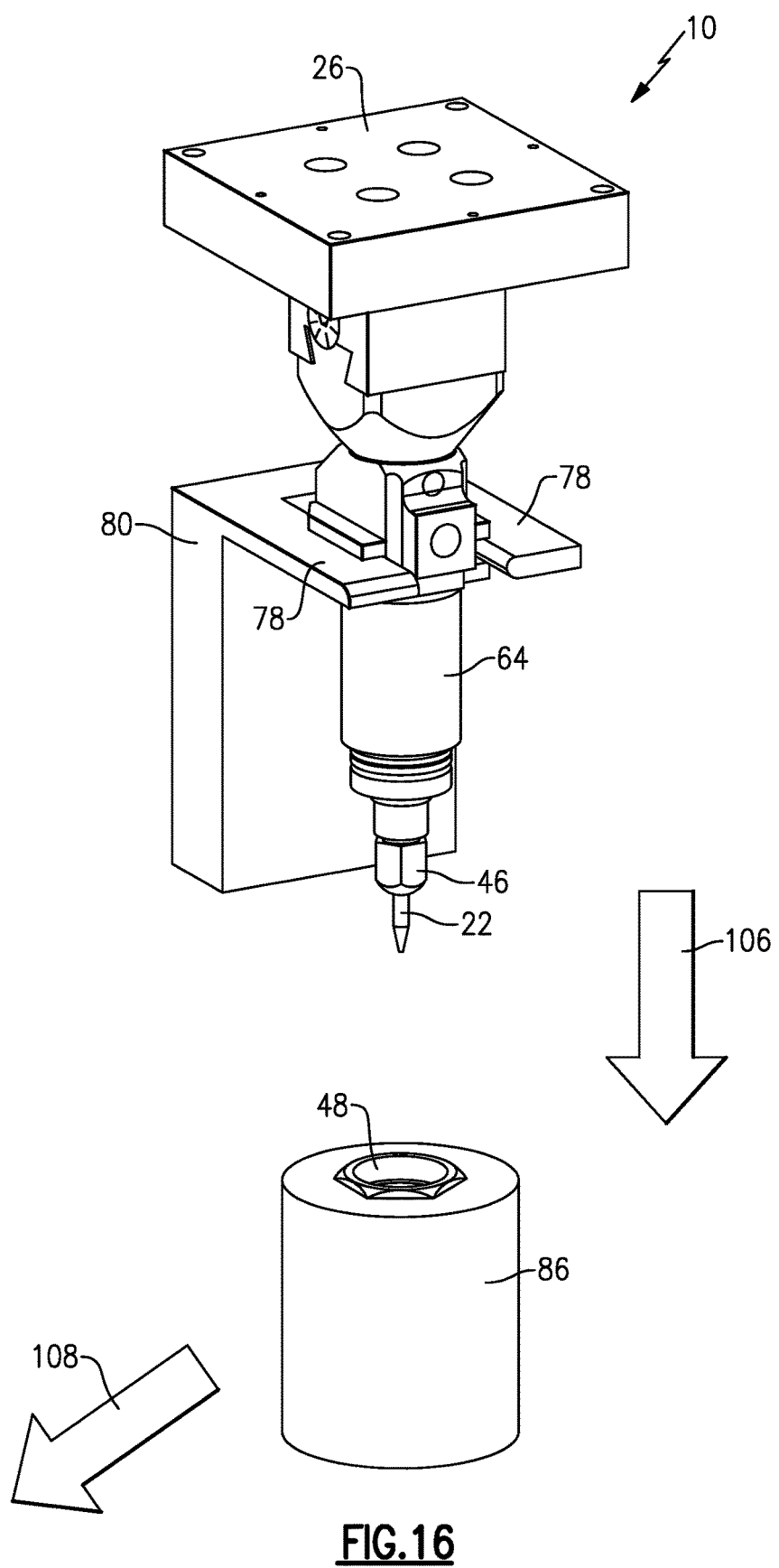

FIG. 14 shows a cup gripping socket 86 that is moved by a first servo-controlled nut runner (not shown) upwardly along arrow 102 towards the welding torch 24 for engaging and gripping the cup gripping socket 86. In FIG. 15, the cup gripping socket 86 is engaged with the shield gas cup 48, and the cup gripping socket 86 is then rotated counter-clockwise about arrow 104 to disengage the right hand threaded shield gas cup 48 from the torch body 64 and then withdraw to permit access for the electrode 22 removal process. As shown in FIG. 16, the cup gripping socket 86, which now holds the shield gas cup 48, is retracted from the torch body 64 and moved downwardly away from the welding torch 64 along arrow 108 to another location for use later.

Figure 17:
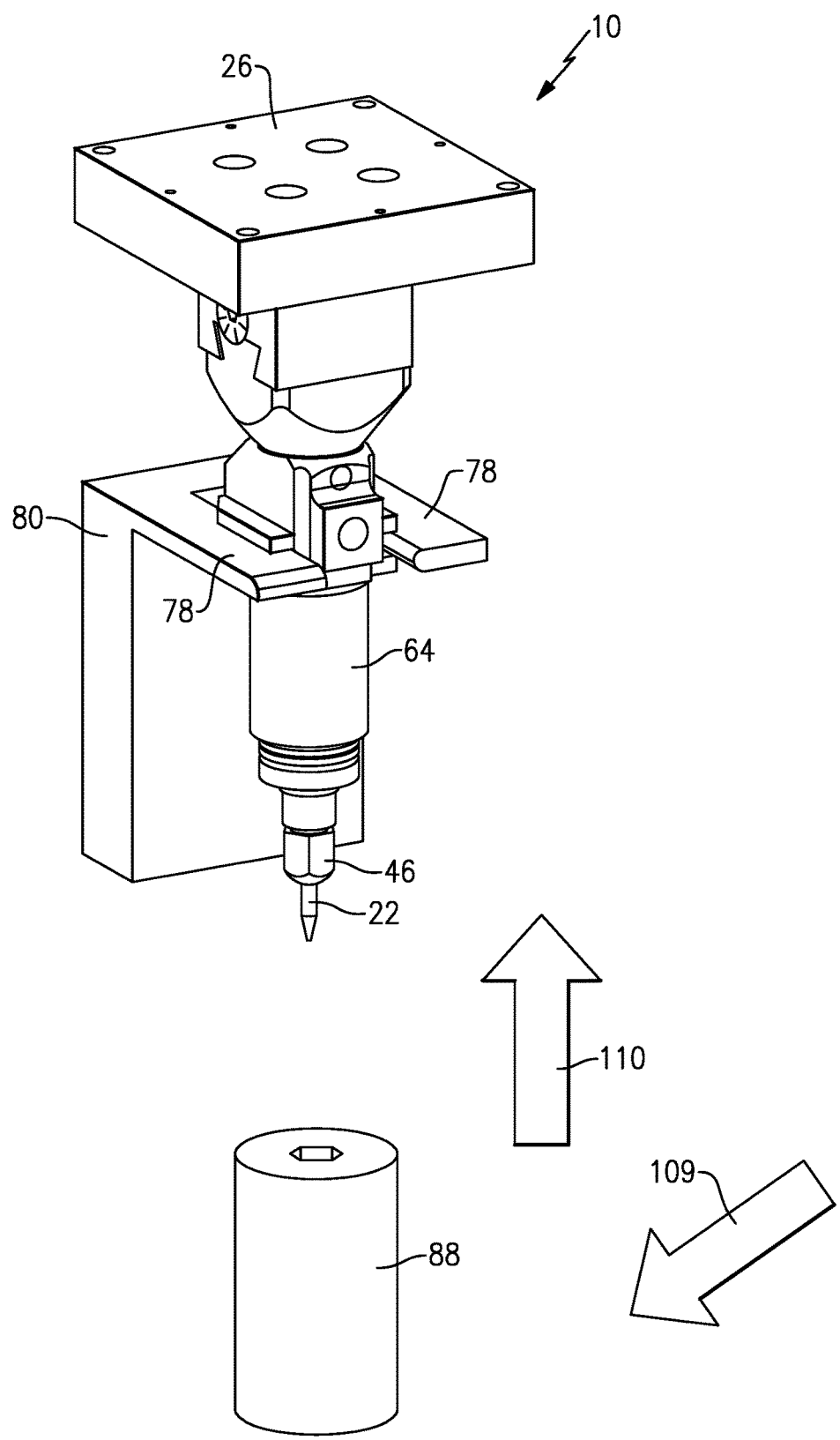
Figure 18:
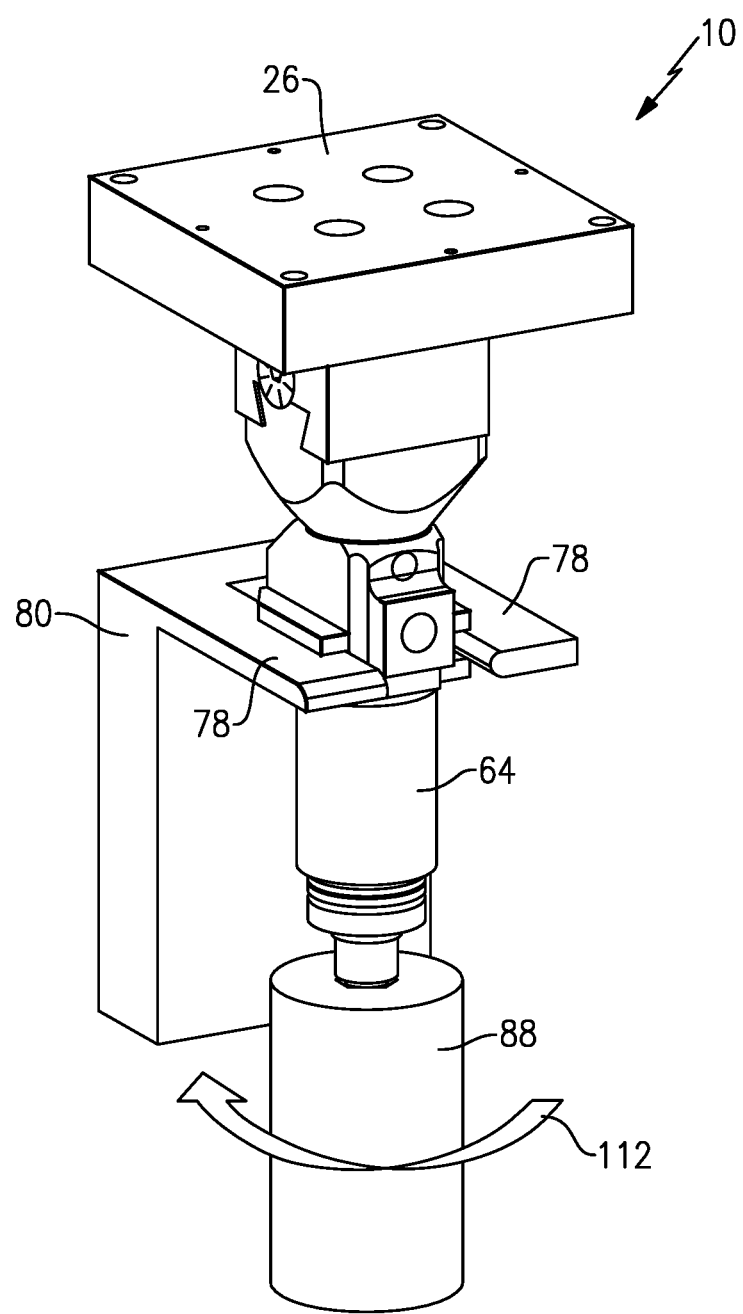
Figure 19:
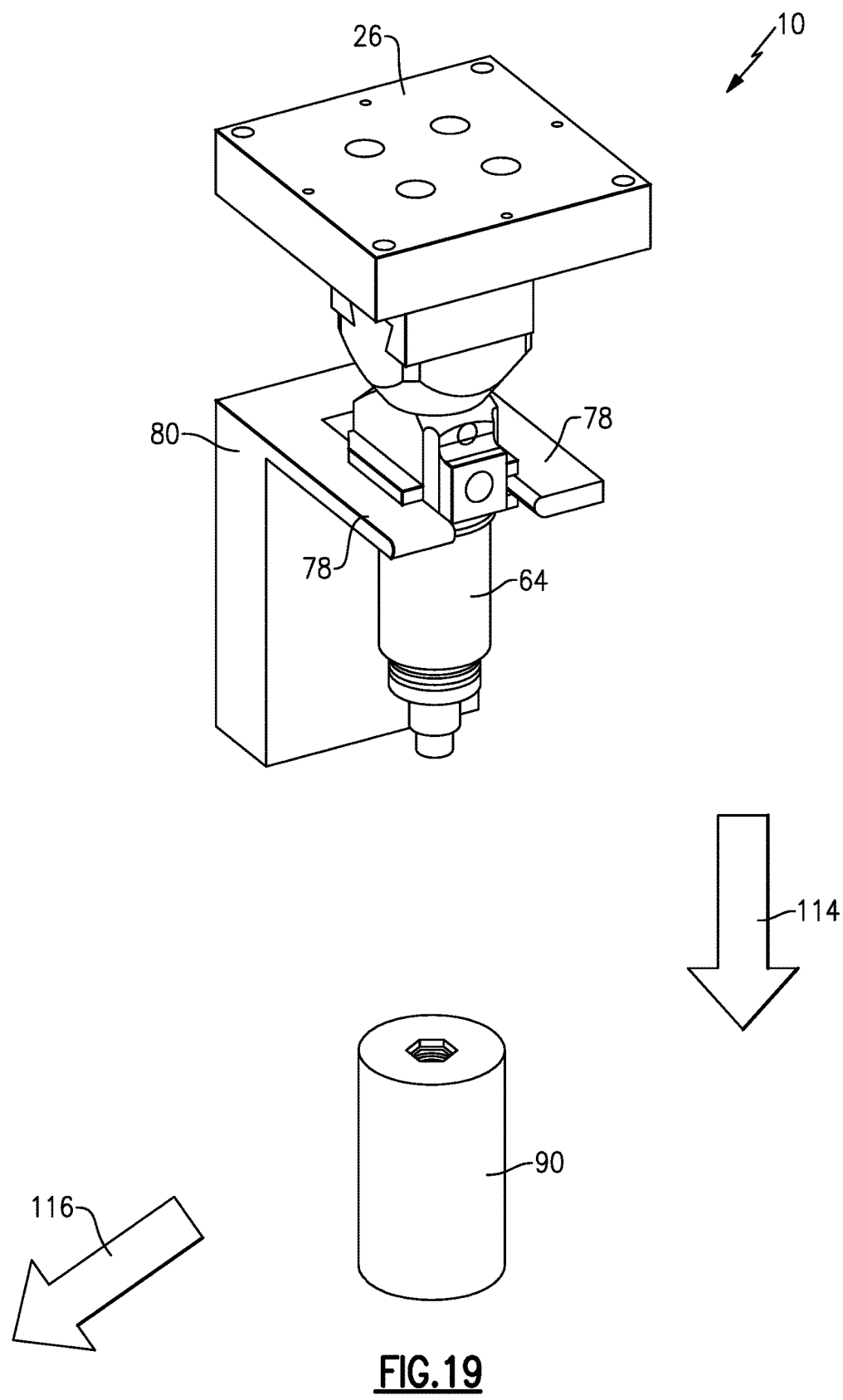

In FIG. 17, a second servo-controlled nut runner (not shown) moves an empty electrode gripping socket 88 towards the docked welding torch 24 along arrow 109 and upwardly along arrow 110 to engage the docked welding torch 24. In FIG. 18, the electrode gripping socket 88 is rotated counter-clockwise about arrow 112 to disengage the electrode 22 and the retaining nut 46 from the right handed threaded electrode holder 40. In FIG. 19, the electrode gripping socket 88 holding the electrode 22 and the retaining nut 46 is moved downwardly along the arrow 114 away from the welding torch 24 and away from the welding torch 24 along arrow 116. The electrode gripping socket 88 can be moved to a "dump station," where the electrode 22 and the retaining nut 46 are released into a bin. The retaining nut 46 can be recovered and reused, and the electrode 22 can be collected and recycled.

Figure 21:
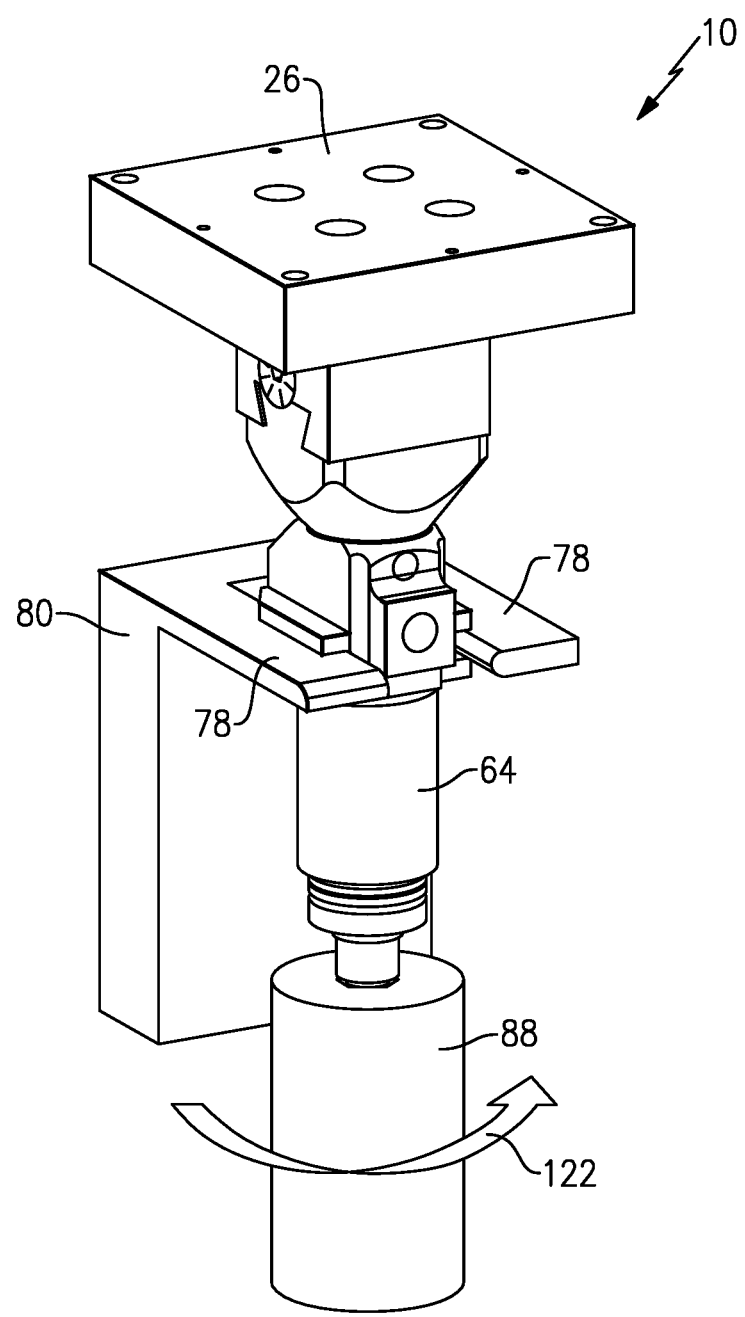

In FIG. 20, an electrode replacement socket 90 that is pre-loaded with a retaining nut 46 and an electrode 22 is moved along arrow 118 by a third servo-controlled nut runner (not shown) to be located under the welding torch 24 and then moved upwardly along arrow 120 to engage the welding torch 24. As shown in FIG. 21, after the pre-loaded electrode replacement socket 90 engages the welding torch 24, the pre-loaded electrode replacement socket 90 is rotated clockwise along arrow 122 to secure the electrode 22 and the retaining nut 46 to the torch body 64 of the welding torch 24. The pre-loaded electrode replacement socket 90 is driven by a servo drive so that a precise and preset tightening torque can be applied. In one example, the tightening torque is about 180 to about 200 N cm. After tightening to the pre-set torque, as shown in FIG. 22, the servo driven electrode replacement socket 90 disengages from the retaining nut 46. The pre-loaded electrode replacement socket 90 disengages from the welding torch 24 by moving downwardly along arrow 124 and away from the welding torch 24 along arrow 126, preparing the welding torch 24 for re-fitment of the shield gas cup 48.

Figure 23:
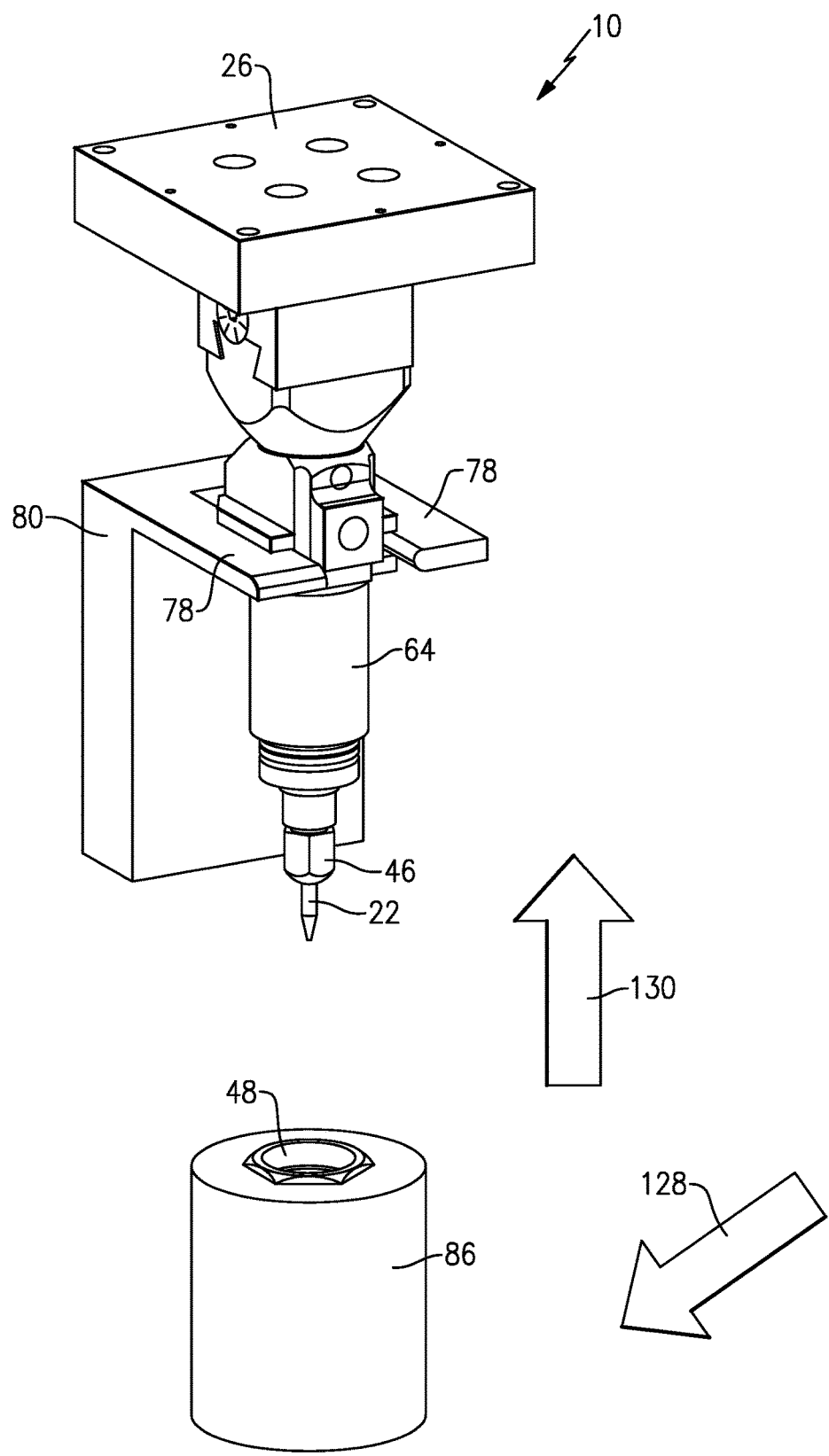
Figure 24:
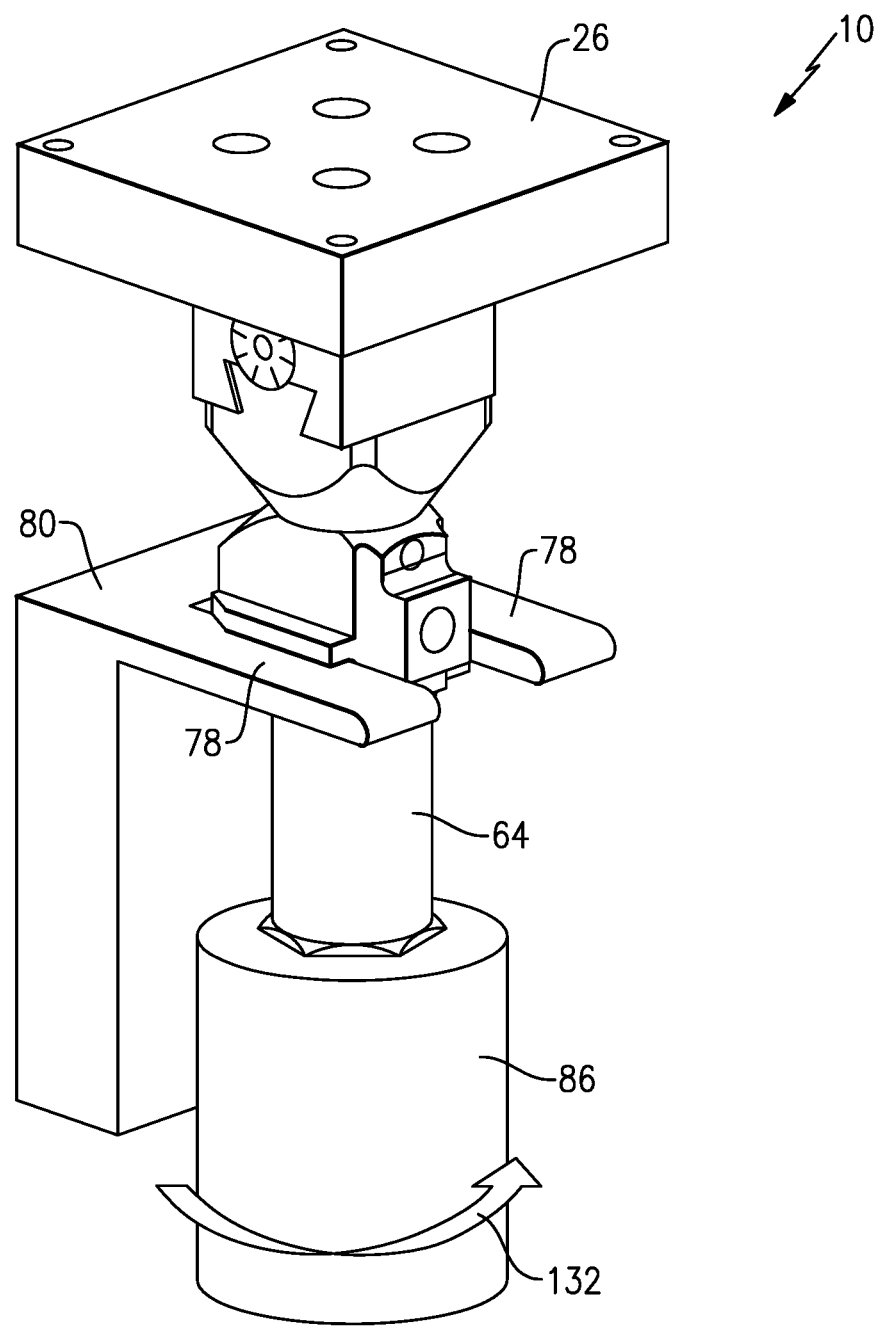
Figure 25:
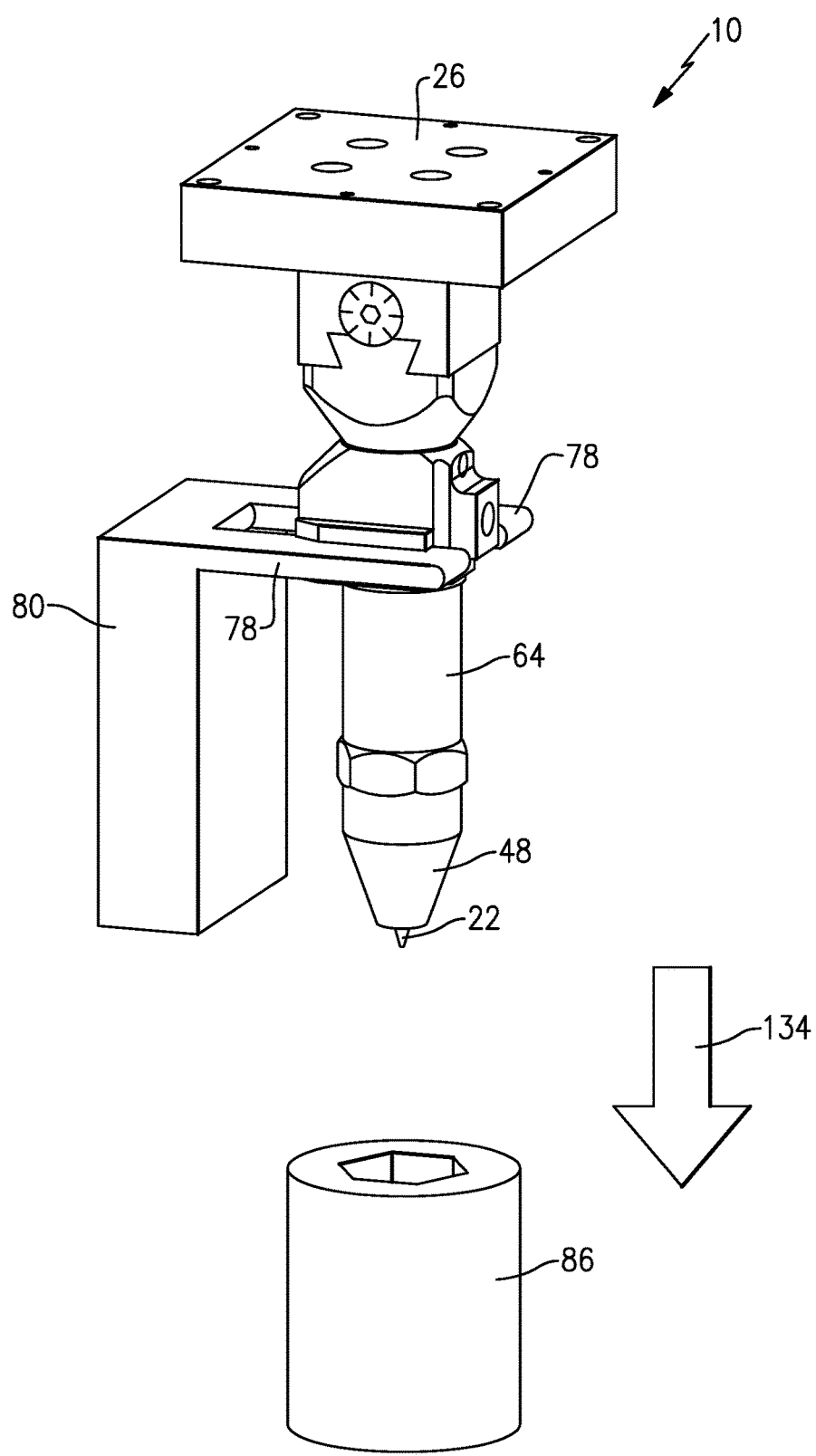

In FIG. 23, the first servo-controlled nut runner returns the cup gripping socket 86 that holds the shield gas cup 48 to the fixed docking station 80 to reinstall the shield gas cup 48 to the torch body 64 of the welding torch 24. The cup gripping socket 86 is moved by the first servo-controlled nut runner along arrow 128 and then upwardly along arrow 130 to engage the welding torch 24. In FIG. 24, the shield gas cup 48 is reengaged with the welding torch 24 and rotated by the controlled torque servo drive about arrow 132 to thread the shield gas cup 48 onto the welding torch 24 using the controlled torque servo drive. In one example, the shield gas cup 48 is tightened to a torque of about 50 N cm. In FIG. 25, the cup gripping socket 86 is withdrawn along arrow 134 after the shield gas cup 48 is refitted.

Figure 26:
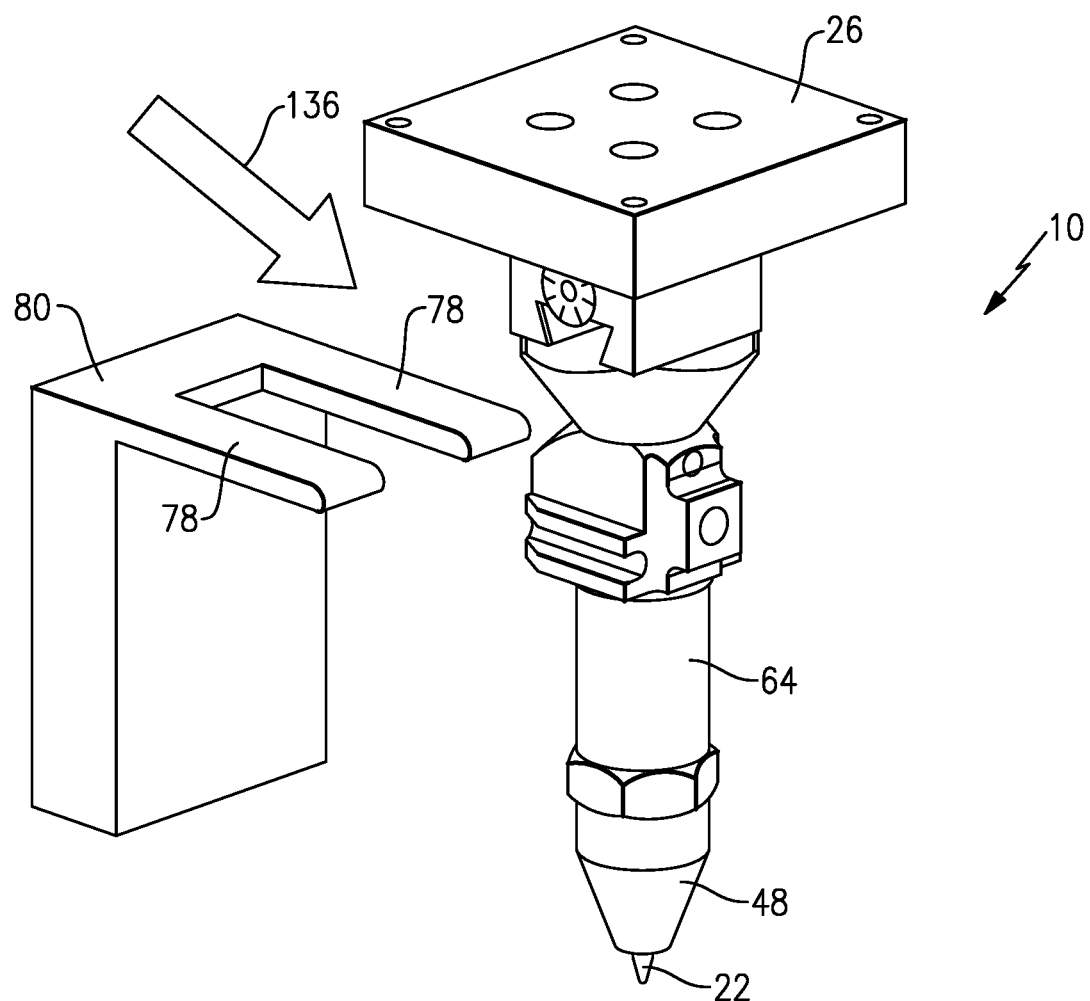

FIG. 26 shows the robot arm 14 removing the welding torch 24 from the fixed docking station 80 along arrow 136. The welding torch 24 can now be retuned to the seam tracker 12 and can continue welding until the electrode 22 needs replacement again. When the electrode 22 needs replacement, the steps shown and described in FIGS. 12 to FIG. 26 are repeated. This automated method is fast, as the shield gas cup 48, the electrode 22, and the retaining nut 46 can be removed from the welding torch 24 and reinstalled in the welding torch 24 in about 5 to 10 seconds.

Figure 27:
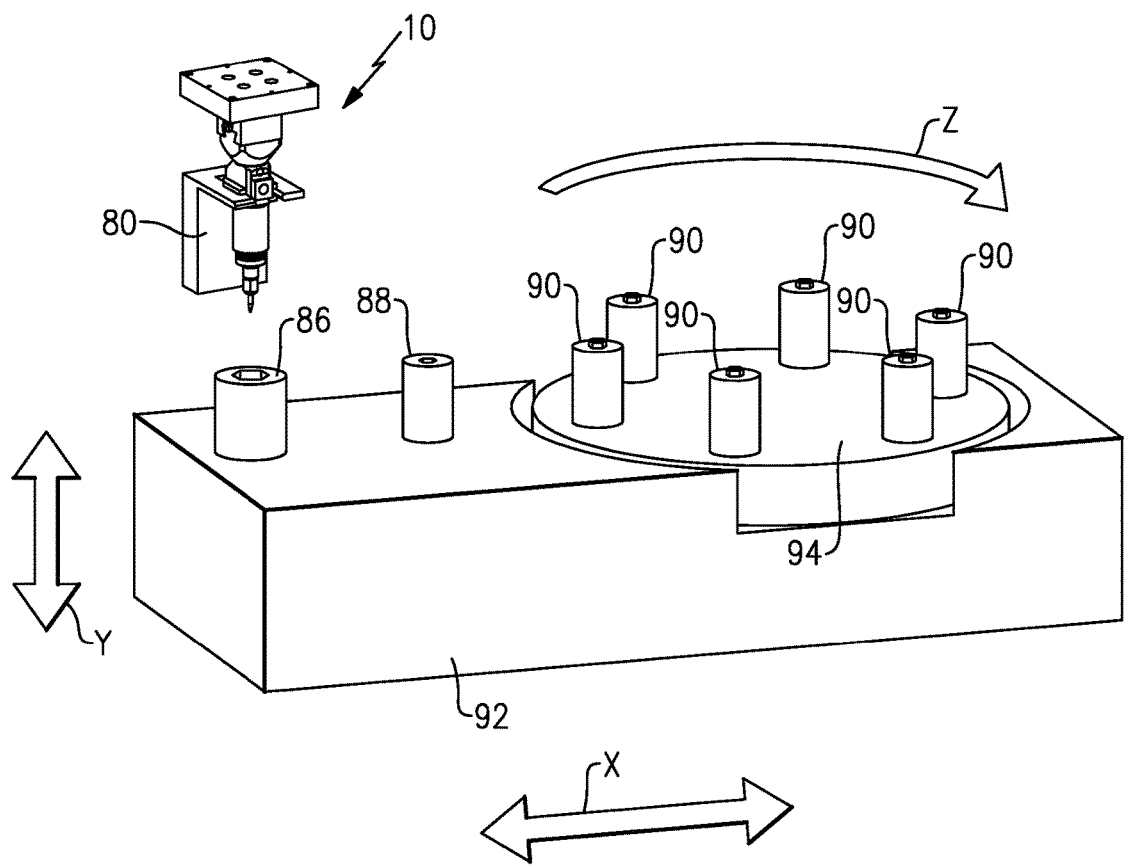
FIG. 27 illustrates a servo slide that holds sockets that are employed to change the electrode of the welding torch.

FIG. 27 illustrates the servo slide 92 that holds the cup gripping socket 86, the electrode gripping socket 88 and a plurality of a pre-loaded electrode replacement sockets 90 that are pre-installed each with an electrode 22 and a retaining nut 46. The servo-controlled nut runners lift and move the sockets 86, 88 and 90 towards and away from the servo slide 92 and the welding torch 24 for the removal and installation of the parts.

The servo slide 92 holds the sockets 86, 88 and 90. A plurality a pre-loaded electrode replacement sockets 90 are located on a rotary table 94 and are each pre-loaded with a new electrode 22 and a new retaining nut 46. The rotary table 94 rotates to align the robot arm 14 with one of the pre-loaded electrode replacement sockets 90.

In one example, the servo slide 92 moves to position the required gripping socket 86, 88 and 90 near the welding torch 24 to remove and install the necessary part. The servo slide 92 is moveable in the direction X and the direction Y, and the rotary table 94 rotates in the direction Z. The servo slide 92 moves to align each of the cup gripping socket 86 and the electrode gripping socket 88 with the welding torch 24 to remove the shield gas cup 48 and the electrode 22/retaining nut 46, respectively. The servo slide 92 then moves into the desired position, and the rotary table 94 rotates to position a pre-loaded electrode replacement socket 90 under the welding torch 24 to install a new electrode 22 and a new retaining nut 46. The servo slide 92 them moves such that the cup gripping socket 86 holding the gas shield cup 48 can be installed on the welding torch 24. Although it is described that the servo slide 92 moves, it is also possible for the welding torch 24 to move.

In another embodiment, if the seam tracker 12 can resist the torques applied during the replacement of the electrode 22, then the fixed docking station can be omitted. In this example, the robot arm 14 is programmed to move the welding torch 24 to the servo-controlled nut runners, engaging and disengaging the welding torch 24 as needed. In this example, the arrows 100 to 134 described above can represent movement of the welding torch 24.

The welding torch 24 can be employed to weld workpieces 18 together. In one example, the workpieces 18 includes a roof and a body of a vehicle. As the electrode 22 is smaller than prior electrodes, there is more control of the welding torch 24, and therefore the welding process is more accurate and creates welding with a more aesthetic appearance that can be covered by paint, eliminating the need of plastic trim to cover the weld seam. Additionally, as the welding is more accurate and the weld seam is more aesthetic, more vehicle designs are possible as smaller pieces of metal can be used to form the vehicle.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. An electrode comprising:
   an elongated body defining a longitudinal axis;
   a seating end portion including a first truncated cone, wherein the first truncated cone defines a first included angle and includes a first truncated end, and the seating end portion includes an opposing base end; and
   a working end portion including a second truncated cone, wherein the second truncated cone defines a second included angle and includes a second truncated end, and the first included angle is different from the second included angle; and
   a constant length defined between the opposing base end and the second truncated end, wherein the constant length is about 0.875 inch +/−0.001 inch,
   wherein the elongated body is located between the seating end portion and the working end portion.

2. The electrode as recited in claim 1, wherein the first included angle is about 45°.

3. The electrode as recited in claim 1, wherein the second included angle is about 30°.

4. The electrode as recited in claim 1, wherein the first truncated end is substantially planar and substantially perpendicular to the longitudinal axis and has a circular shape.

5. The electrode as recited in claim 1, wherein the second truncated end is substantially planar and substantially perpendicular to the longitudinal axis and has a circular shape.

6. The electrode as recited in claim 1, wherein the seating end portion includes a circumferential surface and a first seating end angled surface located between the circumferential surface and the elongated body, the circumferential surface is located between the first truncated cone and the first seating end angled surface, and the first seating end angled surface defines an included angle of about 90°, wherein the seating end portion includes a second seating end angled surface, wherein the second seating end angled surface is located between the circumferential surface and the first truncated end.

7. An electrode comprising:
   an elongated body defining a longitudinal axis;
   a seating end portion including a first truncated cone that defines a first included angle and includes a first truncated end; and
   a working end portion including a second truncated cone that defines a second included angle and includes a second truncated end, and the first included angle is different from the second included angle,
   wherein the elongated body is located between the seating end portion and the working end portion.

8. The electrode as recited in claim 7 wherein the first included angle is about 45°.

9. The electrode as recited in claim 7, wherein the second included angle is about 30°.

10. The electrode as recited in claim 7, wherein the first truncated cone has a first truncated end and an opposing base end, the second truncated cone has a second truncated end, a constant length is defined between the opposing base end, and the second truncated end and the constant length is about 0.875 inch +/−0.001 inch.

11. The electrode as recited in claim 1, wherein the first truncated end is flat and substantially perpendicular to the longitudinal axis.

12. The electrode as recited in claim 1, wherein the second truncated end is flat and substantially perpendicular to the longitudinal axis.

13. The electrode as recited in claim 1, wherein the seating end portion includes a circumferential surface and a first seating end angled surface located between the circumferential surface and the elongated body, the circumferential surface is located between the first truncated cone and the first seating end angled surface.

14. The electrode as recited in claim 13, wherein the seating end portion includes a second seating end angled surface, wherein the second seating end angled surface is located between the circumferential surface and the first truncated end.

15. The electrode as recited in claim 14, wherein the first seating end angled surface defines an included angle of about 90°.

16. The electrode as recited in claim 14, wherein an outer diameter of the circumferential surface is greater than an outer diameter of the elongated body.

17. The electrode as recited in claim 7, wherein the seating end portion includes a first truncated end and the working end portion including a second truncated end, and both the first truncated end and the second truncated end have a circular profile.

18. The electrode as recited in claim 17, wherein the seating end portion includes a circumferential surface and a first seating end angled surface located between the circumferential surface and the elongated body, the circumferential surface is located between the first truncated cone and the first seating end angled surface.

19. The electrode as recited in claim 18, wherein the seating end portion includes a second seating end angled surface, wherein the second seating end angled surface is located between the circumferential surface and the first truncated end.

20. The electrode as recited in claim 19, wherein an outer diameter of the circumferential surface is greater than an outer diameter of the elongated body.

21. An electrode comprising:
 an elongated body defining a longitudinal axis;
 a seating end portion including a first truncated cone, wherein the first truncated cone defines a first included angle and includes a first truncated end, and the seating end portion includes an opposing base end, wherein the seating end portion includes a circumferential surface and a first seating end angled surface located between the circumferential surface and the elongated body, the circumferential surface is located between the first truncated cone and the first seating end angled surface, the seating end portion includes a second seating end angled surface, wherein the second seating end angled surface is located between the circumferential surface and the first truncated end; and
 a working end portion including a second truncated cone, wherein the second truncated cone defines a second included angle and includes a second truncated end, and the first included angle is different from the second included angle; and
 a constant length defined between the opposing base end and the second truncated end, wherein the constant length is about 0.875 inch +/−0.001 inch,
wherein the elongated body is located between the seating end portion and the working end portion.

22. An electrode comprising:
an elongated body defining a longitudinal axis;
a seating end portion including a first truncated cone and a first truncated end, the first truncated end having a circular profile, wherein the seating end portion includes a circumferential surface and a first seating end angled surface located between the circumferential surface and the elongated body, the circumferential surface is located between the first truncated cone and the first seating end angled surface, the seating end portion includes a second seating end angled surface, and the second seating end angled surface is located between the circumferential surface and the first truncated end; and
a working end portion including a second truncated cone and a second truncated end, the second truncated end having a circular profile,
wherein the elongated body is located between the seating end portion and the working end portion.

* * * * *